United States Patent
Holzapfel et al.

(10) Patent No.: US 9,410,797 B2
(45) Date of Patent: Aug. 9, 2016

(54) OPTICAL POSITION-MEASURING DEVICE

(71) Applicant: DR. JOHANNES HEIDENHAIN GMBH, Traunreut (DE)

(72) Inventors: Wolfgang Holzapfel, Obing (DE); Jörg Drescher, Samerberg (DE); Robert Kellner, Waging am See (DE); Markus Meissner, Übersee (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 14/508,097

(22) Filed: Oct. 7, 2014

(65) Prior Publication Data
US 2015/0098090 A1    Apr. 9, 2015

(30) Foreign Application Priority Data
Oct. 7, 2013    (DE) .......................... 10 2013 220 184

(51) Int. Cl.
*G01B 11/02*    (2006.01)
*G01B 11/14*    (2006.01)
(Continued)

(52) U.S. Cl.
CPC ............ *G01B 11/14* (2013.01); *G01B 9/02049* (2013.01); *G01B 9/02083* (2013.01); *G01D 5/38* (2013.01)

(58) Field of Classification Search
CPC ..... G01D 5/38; G01D 5/34715; G01D 5/366; G01B 9/02; G01P 3/366
USPC .......................................................... 356/499
See application file for complete search history.

(56) References Cited

U.S. PATENT DOCUMENTS 6,249,626 B1 *  6/2001  Bergmann ........... G02B 6/2817
                                                          385/48
7,483,120 B2    1/2009  Luttikhuis et al.
(Continued)

FOREIGN PATENT DOCUMENTS

EP    1 533 594    5/2005
EP    1 762 828    3/2007
(Continued)

OTHER PUBLICATIONS

European Search Report issued in European Patent Application No. 14 17 9262, dated Feb. 17, 2015.
(Continued)

*Primary Examiner* — Tarifur Chowdhury
*Assistant Examiner* — MD Rahman
(74) *Attorney, Agent, or Firm* — Kenyon & Kenyon LLP (57) ABSTRACT

A position-measuring device for detecting the position of two objects movable relative to each other, includes a measuring standard that is joined to one of the two objects, as well as a scanning system for scanning the measuring standard, the scanning system being joined to the other of the two objects. The scanning system permits a simultaneous determination of position along a first lateral shift direction and along a vertical shift direction of the objects. To that end, on the part of the scanning system, two scanning beam paths are formed, in which a group of phase-shifted signals is able to be generated in each case at the output end from interfering partial beams of rays. In addition, via the scanning system, at least a third scanning beam path is formed, by which it is possible to determine position along a second lateral shift direction of the objects. The beam from a light source is able to be supplied to the scanning system via a first light guide and coupling-in optics in common for all three scanning beam paths. The interfering partial beams of rays produced in the three scanning beam paths are able to be coupled via common coupling-out optics, into a second light guide which supplies these beams of rays to a detector system.

22 Claims, 10 Drawing Sheets (51) Int. Cl.
*G01D 5/38* (2006.01)
*G01B 9/02* (2006.01)

(56) References Cited

U.S. PATENT DOCUMENTS

| | | |
|---|---|---|
| 7,573,581 B2 | 8/2009 | Holzapfel |
| 7,710,578 B2 | 5/2010 | Sändig et al. |
| 2007/0058173 A1* | 3/2007 | Holzapfel .............. H05G 2/008 356/499 |
| 2008/0079920 A1* | 4/2008 | Hommen .............. G03F 7/7085 355/55 |
| 2009/0195792 A1* | 8/2009 | Hermann et al. ............. 356/622 |
| 2011/0141451 A1 | 6/2011 | Yamaguchi et al. |
| 2012/0032067 A1 | 2/2012 | Goodwin et al. |
| 2013/0335746 A1* | 12/2013 | Huber et al. .................. 356/498 |

FOREIGN PATENT DOCUMENTS

| EP | 1 826 615 | 8/2007 |
|---|---|---|
| EP | 1 901 041 | 3/2008 |

OTHER PUBLICATIONS

Gao, W. et al., "A Three-axis Displacement Sensor with Nanometric Resolution", Annals of the CIRP, vol. 56, Jan. 2007.
European Search Report, dated May 20, 2015, issued in corresponding European Patent Application No. 14185047.9.

* cited by examiner

OPTICAL POSITION-MEASURING DEVICE

CROSS-REFERENCE TO RELATED APPLICATIONS

The present application claims priority to Application No. 10 2013 220 184.2, filed in the Federal Republic of Germany on Oct. 7, 2013, which is expressly incorporated herein in its entirety by reference thereto.

FIELD OF THE INVENTION

The present invention relates to an optical position-measuring device, which may be suitable for the extremely precise determination of the relative position of two objects movable relative to each other.

BACKGROUND INFORMATION

European Published Patent Application No. 1 762 828 and U.S. Pat. No. 7,573,581, each of which is expressly incorporated herein in its entirety by reference thereto, describe an optical position-measuring device, which includes a measuring standard joined to one of two objects, as well as at least one scanning system for scanning the measuring standard, the scanning system being joined to the other of the two objects. The scanning system is arranged such that it permits simultaneous determination of position along a first lateral shift direction and along a vertical shift direction of the objects. In order to determine position in the first lateral and vertical shift direction, on the part of the scanning system, first and second scanning beam paths are formed, in which in each case from two non-mirror-symmetric, interfering partial beams of rays, a group of phase-shifted signals is able to be generated at the output end.

The beam from the light source is supplied to the scanning system via a first light guide. This makes it possible to locate the light source away from the measuring location. In addition, the interfering partial beams of rays provided by the scanning system are supplied to the detector system via a second light guide, to in this manner minimize disturbances of the detector system.

SUMMARY OF THE INVENTION

According to example embodiments of the present invention, it is possible to determine a position along a second lateral shift direction of the objects using an optical position-measuring device.

According to an example embodiment of the present invention, an optical position-measuring device for detecting the position of two objects movable relative to each other includes a measuring standard, which is joined to one of the two objects, as well as a scanning system for scanning the measuring standard, the scanning system being joined to the other of the two objects, the scanning system permitting simultaneous determination of position along a first lateral shift direction as well as along a vertical shift direction of the objects, and to that end, on the part of the scanning system, two scanning beam paths being formed, in which a group of phase-shifted signals is able to be generated in each case at the output end from interfering partial beams of rays. In addition, via the scanning system, at least a third scanning beam path is formed, by which it is possible to determine position along a second lateral shift direction of the objects. The beam from a light source is able to be supplied to the scanning system via a first light guide and coupling-in optics in common for all three scanning beam paths. The interfering partial beams of rays produced in the three scanning beam paths are able to be coupled via coupling-out optics in common, into a second light guide, which supplies these beams of rays to a detector system.

At the input end, the scanning system may include a splitting grating which splits the beam of rays incoming from the coupling-in optics into three scanning beam paths, the $+/-1^{st}$ orders of diffraction of the splitting grating being assigned to the first and second scanning beam paths, and the zeroth order of diffraction being assigned to the third scanning beam path.

It may be provided that in the third scanning beam path, a partial beam of rays propagates in the direction of the measuring standard, is split there into two further partial beams of rays, which are reflected back in the direction of the scanning system, where in each case they undergo a retroreflection and—offset along the second lateral shift direction (X)—propagate again in the direction of the measuring standard, where they come interferingly to superposition and propagate back in the direction of the scanning system, where a plurality of phase-shifted signals with regard to a relative movement along the second lateral shift direction (X) are detectable from them.

The scanning system includes an optical element, on whose side facing the measuring standard are disposed a plurality of grating fields assigned in defined manner to the various scanning beam paths and having transmission gratings as well as a splitting grating on the coupling-in side and a splitting grating on the coupling-out side.

In this context, the offset distances between the grating fields and the outcoupling gratings along the second lateral shift direction may be selected to be identical.

It is further possible to dispose between the optical element and the measuring standard, a glass cover which extends over all scanning beam paths in terms of its lateral extension.

Alternatively, a thermally compensated glass body may also be provided between the optical element and the measuring standard, so that temperature changes do not alter the optical path lengths of the partial beams of rays traversing in the glass.

In addition, the second light guide may include three multimode fibers per scanning beam path, the multimode fibers being located in one common ferrule at the end on the coupling-in side.

The first and second lateral shift directions may be oriented perpendicularly relative to each other, and the measuring standard may be in the form of a cross grating.

The scanning beam paths of all three shift directions may have a common scanning center.

It may further be provided that between the first and the second impingement on the measuring standard, at least one partial beam of rays in the scanning beam paths undergoes an offset along the particular shift direction.

In order to reflect the partial beams of rays back, the optical element may include diffractive components which combine within themselves several optical functions.

With the aid of the optical position-measuring device described herein, it is possible to determine, with extreme precision, the relative position of two movable objects along at least one further lateral shift direction. In this context, the scanning system placed at the measuring location may be adapted to be completely passive, that is, no heat input by the light source, which could possibly impair the measuring accuracy when determining position in high-precision applications, results. This may be ensured by the connection of the light source and the detector system to the scanning system by light guides. It is considered advantageous that one common coupling-in and coupling-out optics may be used between the scanning system and the light guides for all shift directions, or more precisely, measuring directions of the optical position-measuring device.

Further features and aspects of example embodiments of the present invention are described in more detail below with reference to the appended Figures.

BRIEF DESCRIPTION OF THE DRAWING

FIG. 2b is a plan view of the scanning plate of the scanning system of the optical position-measuring device illustrated in FIG. 2a.

DETAILED DESCRIPTION

Before the optical position-measuring device according to example embodiments of the present invention are explained in greater detail, first of all, the position-measuring device described in European Published Patent Application No. 1 762 828 is briefly explained. As mentioned above, the position-measuring device described in European Published Patent Application No. 1 762 828 is suitable for detecting position changes along two shift directions, or more precisely, measuring axes. In the corresponding scanning system, two scanning beam paths are formed so as to be tilted or asymmetrical relative to each other. In this case, the beam of rays delivered by a light source is supplied via a first light guide in the form of a single mode fiber to the scanning system, and after being coupled out of the light guide, is collimated via collimating optics. The collimated beam of rays thereupon arrives at a splitting grating, in which it is split into two scanning beam paths for two axes. The two axes are also referred to hereinafter as the A-axis and B-axis of the position-measuring device. The position information actually of interest along lateral shift direction Y and vertical shift direction Z is yielded from the summation and the subtraction of position signals A, B according to the following equations 1a and 1b:

$$Y = (A+B)/2 \quad \text{(Equation 1a)}$$

$$Z = (A-B)/2 * SPz/SPy \quad \text{(Equation 1b)}$$

In this context, SPz denotes the signal period in the Z-direction, and SPy the signal period in the Y-direction.

The beams of rays arrive in the respective scanning beam paths first at the measuring standard in the form of a reflection grating, are thereby split into partial beams of rays of $+/-1^{st}$ order of diffraction, and are diffracted back to the scanning system. There, each of the partial beams of rays is folded back by a diffractive roof prism in the direction of the measuring standard. The two partial beams of rays interfere in each case at the measuring standard. The superposed beams of rays are subsequently relayed to coupling-out optics that include a focusing lens and a field lens, and are thereupon coupled out into a second light guide which includes six multimode optical fibers.

In the optical position-measuring device according to example embodiments of the present invention, a further axis, or more precisely, a further scanning beam path is provided that is used to detect position along a second lateral shift direction which is oriented perpendicularly to first lateral shift direction Y. The second lateral shift direction is denoted hereinafter as shift direction X. On the part of the measuring standard, a two-dimensional measuring standard in the form of what is termed a cross grating is provided in this case.

Figure 1A:
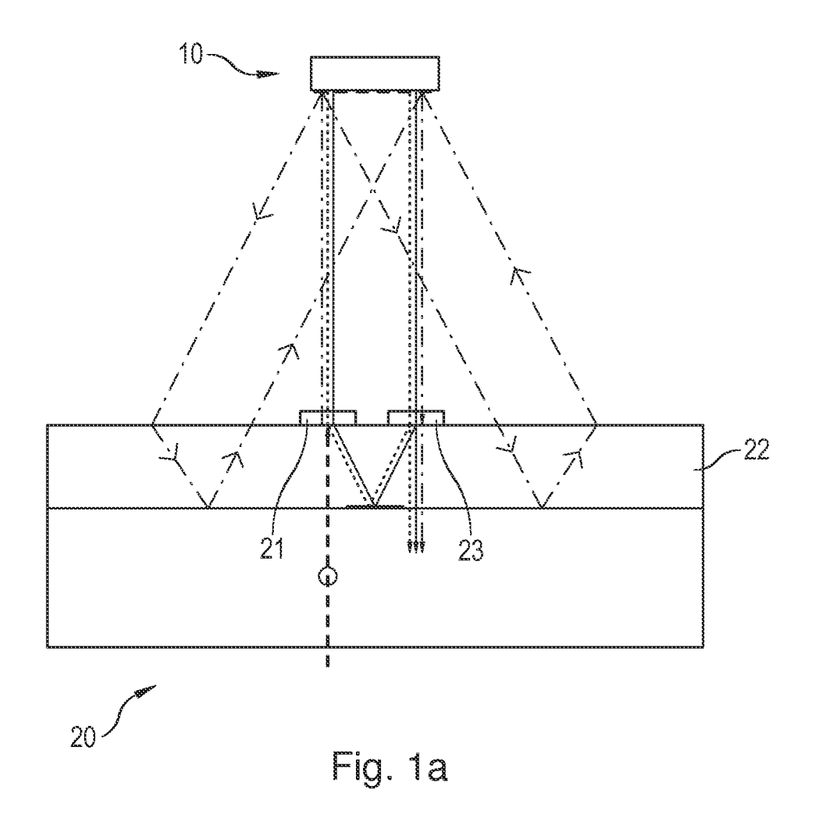
FIG. 1a schematically illustrates scanning beam paths in an optical position-measuring device according to an example embodiment of the present invention.

The scanning beam paths of an optical position-measuring device according to an example embodiment of the present invention are schematically illustrated in various sectional views in FIGS. 1a and 1b, and are explained in more detail below. Illustrated in these views are measuring standard 10 and scanning system 20 having the scanning beam paths which are for detecting changes in position along first lateral shift direction Y and vertical shift direction Z and are represented with dotted lines or solid lines. They correspond to the scanning beam paths described in European Published Patent Application No. 1 762 828 discussed above. On the other hand, the further scanning beam path, added according to example embodiments of the present invention, for detecting position along second lateral shift direction X is represented in FIGS. 1a 1b by dot-dash lines.

Analogous to European Published Patent Application No. 1 762 828, the beam of rays incoming from a light source initially arrives in scanning system 20 on a splitting grating 21 on the coupling-in side, where it is split into the now total of three scanning beam paths. In addition to the resultant partial beams of rays of $+/-1^{st}$ order for the A-axis and the B-axis, that is, for the first and second scanning beam path, the partial beam of rays resulting in the zeroth order of diffraction for the third scanning beam path is used in order to permit detection of position along second lateral shift direction X.

The partial beam of rays of zeroth order of diffraction coming from splitting grating 21 on the coupling-in side is split in the X-direction at measuring standard 10 into two partial beams of rays of $+/-1^{st}$ order, and they are directed back to scanning system 20. In the view illustrated in FIG. 1a, after the splitting at measuring standard 10, the partial beam of rays of $+1^{st}$ order of the third scanning beam path propagates to the left downward, the partial beam of rays of $-1^{st}$ order to the right downward in the direction of scanning system 20. There, they enter into an optical element 22—indicated only schematically—which is in the form of a diffractive roof prism. It includes a first transmission grating, a reflector, and a second transmission grating. The first and second transmission gratings are applied on the top side of optical element 22 which faces measuring standard 10. The reflector is located on the bottom side of optical element 22. The first and second transmission gratings take the form of diffractive structures and combine several optical functions. In each case, they deflect the incoming partial beam of rays in measuring direction X and focus it in transverse direction Y by a cylindrical-lens function onto the bottom side of optical element 22, where the reflector is located. After being reflected at the reflector, it impinges on the second transmission grating which collimates the partial beam of rays again by a cylindrical-lens function in the Y-direction and deflects it in measuring direction X. Thus, the two partial beams of rays each emerge from optical element 22 in a direction opposite of the direction of incidence and equally offset in measuring direction X, and propagate back again to measuring standard 10. As an alternative to the cylindrical-lens function of the transmission gratings, a spherical-lens function may also be provided which in each case focuses or collimates the partial beams of rays again in both directions X and Y. For the overlapping of various optical functions in diffractive structures, reference is additionally made at this point to European Published Patent Application No. 1 739 395 and U.S. Pat. No. 7,573,581, each of which is expressly incorporated herein in its entirety by reference thereto. The two partial beams of rays then impinge on measuring standard 10, where they are again deflected into the $+1^{st}$ and $-1^{st}$ order of diffraction, respectively, so that they are superposed and interfere. The superposed beam of rays propagates parallel to the optical axis, referred to as a "sight line," back to scanning system 20, to then be coupled out together with the beams of the A-axis and B-axis and supplied to a detector system.

Figure 1B:
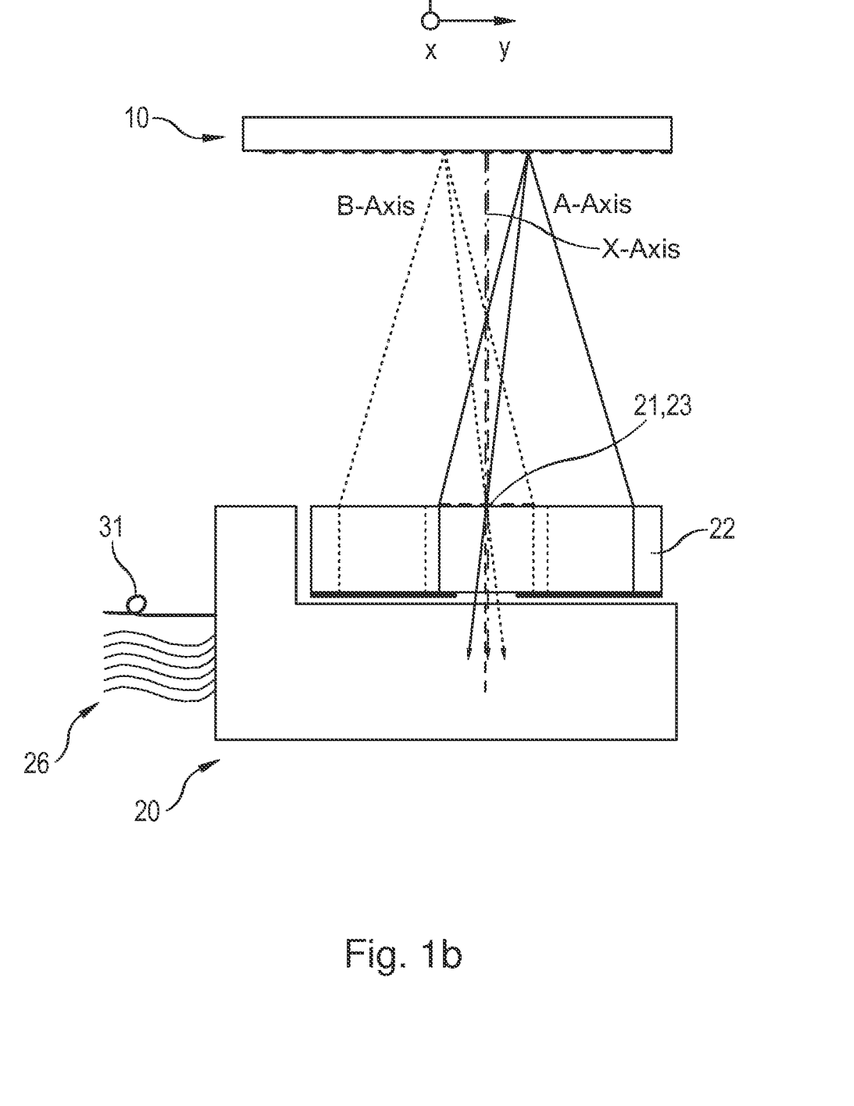
FIG. 1b schematically illustrates the scanning beam paths in an optical position-measuring device according to an example embodiment of the present invention.

FIG. 1b is a cross-sectional view of the position-measuring device taken in the YZ-plane. From this view, it is clear that all beams of rays and partial beams of rays of the third scanning beam path for detecting an X-shift propagate exclusively in the XZ-plane.

FIG. 1b also schematically illustrates a first light guide 31 for conveying the beam of rays from the light source to scanning system 20, as well as a second light guide 26 for conveying the superposed beams of rays from scanning system 20 to the detector system.

Figure 1C:
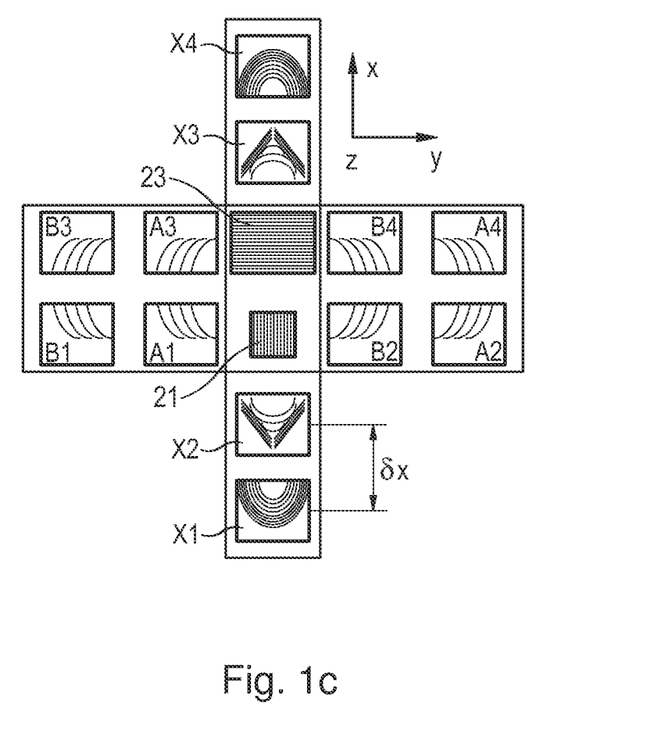
FIG. 1c is a plan view of the scanning plate of the scanning system of the optical position-measuring device illustrated in FIGS. 1a and 1b, with the optical components disposed thereon.

FIG. 1c schematically illustrates a part of the side of scanning system 20, e.g., the top side of optical element 22 which faces measuring standard 10 and on which a plurality of grating fields are disposed having suitably formed transmission gratings which bring about the beam deflections necessary in the three scanning beam paths. In this illustration, the various grating fields are denoted with the designations explained above for the different axes A, B. X of the position-measuring device, and thus are assigned to the three different scanning beam paths. In addition, FIG. 1c illustrates splitting grating 21 on the coupling-in side for the beam of rays incoming from the light source, as well as adjacent splitting grating 23 on the coupling-out side for the again superposed beams of rays of the three scanning beam paths.

The transmission gratings of the A-axis and B-axis located in grating fields A1 to A4 and B1 to B4 act in the X-direction as cylindrical lenses and deflect through an additional superposed linear grating in the Y-direction. The transmission gratings of the X-axis located in grating fields X1 to X4 act, as described above, as cylindrical lenses in the Y-direction, but likewise deflect through a superposed linear grating in the X-direction. The focal plane of the lens functions of all transmission gratings in grating fields A1 to A4, B1 to B4, and X1 to X4 lies in each instance on the opposite bottom side of optical element 22.

The cylindrical-lens functions always bring about a focusing perpendicular to the respective measuring direction X or Y. The deflection functions, on the other hand, may include a deflection both in and transversely to the measuring direction. The deflection functions are selected such that, on one hand, after passing through optical element 22, the partial beams of rays in each case travel back, in anti-parallel fashion, to measuring standard 10, and on the other hand, have a specific offset distance δx, δy. This offset distance δx, δy is selected to be the same for all three scanning beam paths of axes A, B and X. In the present exemplary embodiment, only δx is selected to be unequal to zero, while δy=0 applies. Consequently, the superposed beams of rays impinge at the same location in an XY-plane on splitting grating 23 on the coupling-out side, and are split there into three superposed beams of rays.

As described in European Published Patent Application No. 1 762 828, polarization-optical components are introduced into the beam path of the partial beams of rays according to FIGS. 1a and 1b, and polarize the two, in each case superposed partial beams of rays orthogonally relative to each other. This holds true for additional axis X, as well.

A considerable advantage of such a formation of the third scanning beam path for detecting position along second shift direction X is that both the scanning centers and what are referred to as the neutral pivot points of all three axes A, B and X coincide and form a common scanning center or common neutral pivot point. This is a result of the symmetry of the scanning beam paths: The scanning beam path from the splitting grating on the coupling-in side up to the measuring standard and the scanning beam path from the measuring standard back to the splitting grating on the coupling-out side may be mutually converted by a translation by offset distances δx, δy. The common neutral pivot point therefore lies on an axis along the Z-direction, which is located through the midpoint between the splitting grating on the coupling-in side and the splitting grating on the coupling-out side. The exact Z-position of the common neutral pivot point along this axis is determined by the selection of the grating constants of the splitting grating on the coupling-in side and of the measuring standard. The common neutral pivot point for all three shift directions X, Y and Z has particular advantages. A small tilting of the measuring standard or of the scanning unit about any axis through this common neutral pivot point shifts—in linear approximation—none of position values X, Y or Z of this position-measuring device. The measured values of this position-measuring device may therefore be easily interpreted: they furnish the position of the displaceable object at the location of this common neutral pivot point. If the individual scanning beam paths of axes A, B and X had different neutral pivot points, then complicated transformations of the position values would have to be carried out in order to be able to determine the XYZ-position of the movable object at an object point.

Figure 2A:
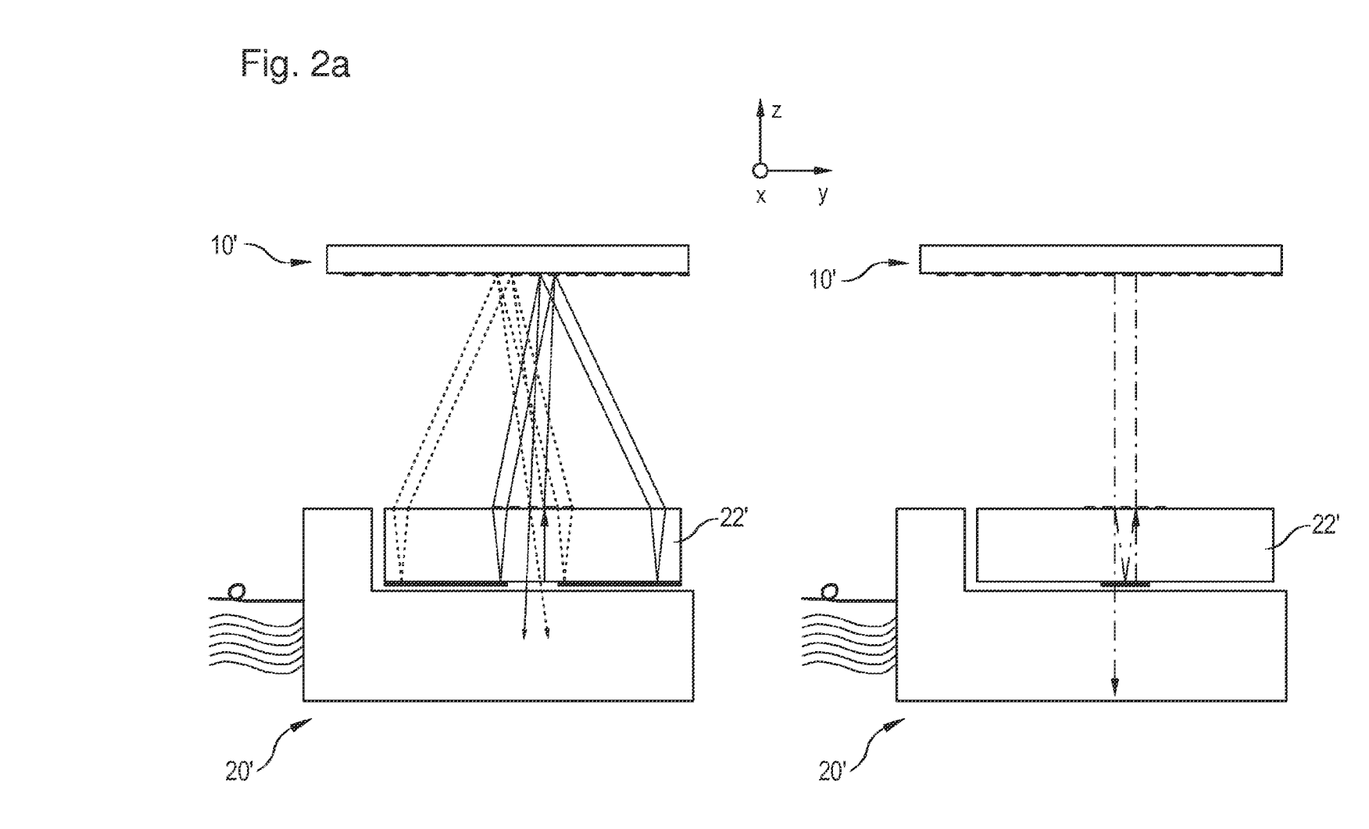
FIG. 2a schematically illustrates scanning beam paths of an optical position-measuring device according to an example embodiment of the present invention.

FIG. 2a schematically illustrates the scanning beam paths of an optical position-measuring device according to another example embodiment of the present invention. The scanning beam paths for axes A, B are schematically illustrated in the left-side representation, and the third scanning beam path additionally provided for the X-axis is schematically illustrated in the right-side representation. Analogous to FIG. 1c, FIG. 2b illustrates the placement of the various grating fields and splitting gratings on the top side of the optical element.

The third scanning beam path of this exemplary embodiment is explained in the following, the grating fields and splitting gratings being traversed substantially in the same order as in the exemplary embodiment illustrated in FIGS. 1a to 1c. However, the optical effects of individual transmission gratings and the placement of the corresponding grating fields differ from the exemplary embodiment explained above.

The partial beam of rays assigned to the X-axis, which emerges in the zeroth order of diffraction from splitting grating 21' on the coupling-in side, impinges on measuring standard 10', where it is split by diffraction into two partial beams of rays of $+1^{st}$ and $-1^{st}$ order of diffraction. These partial beams of rays propagate back to the scanning system. There, they strike grating fields X1' and X3', respectively, in optical element 22'. The transmission gratings located in these grating fields X1', X3' are adapted such that in each case they combine several optical functions within themselves. Thus, the partial beams of rays falling on them are deflected by them in measuring direction X (function of a deflection grating) and at the same time are focused perpendicularly to that in the Y-direction (cylindrical-lens function). In addition, a deflection in the Y-direction (function of a deflection grating) results via the transmission gratings of grating fields X1', X3' in the present exemplary embodiment. The focus of the partial beams of rays influenced in this manner by the transmission gratings lies again in the case of all partial beams of rays on a reflector which is located on the opposite bottom side of optical element 22'. The partial beams of rays are reflected there and then impinge in optical element 22' on grating fields X2', X4'. The transmission gratings located there likewise again combine several optical functions. Thus, analogous to the exemplary embodiment above, the partial beams of rays are again collimated by them (cylindrical-lens function) and deflected in measuring direction X (function of a deflection grating). In the present exemplary embodiment, additionally a deflection in the Y-direction (function of a deflection grating) also results via them. The two partial beams of rays emerging from grating fields X2', X4' ultimately meet again at one point on measuring standard 10', where they superimpose and interfere and subsequently propagate back again to scanning system 20', where they pass through splitting grating 23' of the coupling-out optics on the coupling-out side and then propagate in the direction of the detector system.

Figure 2B:
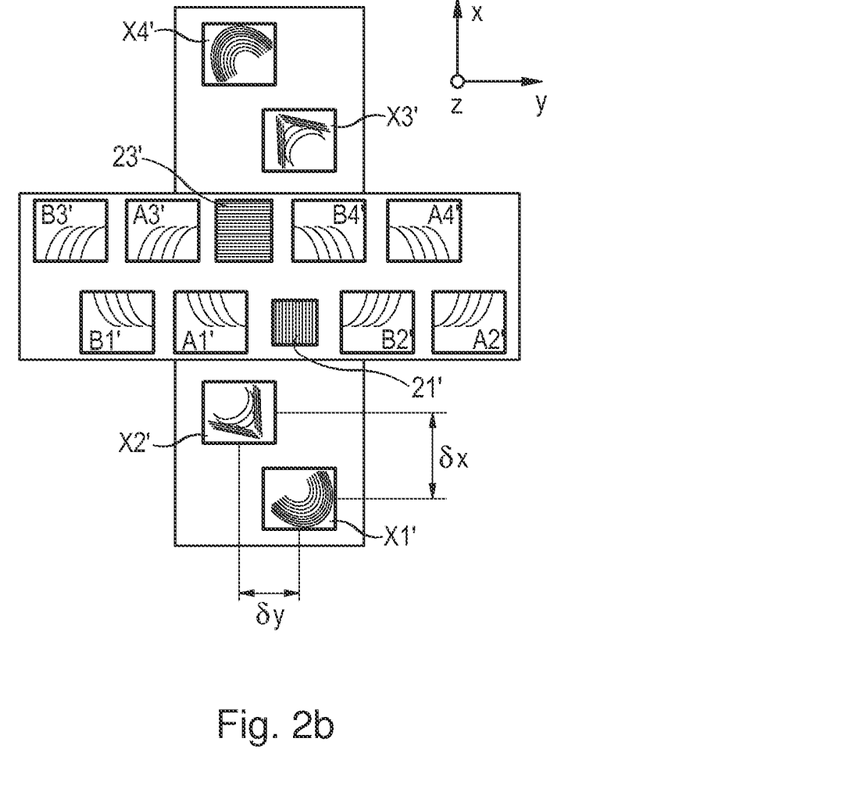

As illustrated in FIG. 2b, in this exemplary embodiment, all grating fields which the partial beams of rays pass through during the first and second transit are offset relative to each other both in the measuring direction of the respective axis and perpendicular to the measuring direction of the respective axis. Therefore, the Y-deflection of the line gratings of grating fields A1' to A4' and B1' to B4' are arranged such that the partial beams of rays are able to traverse via the reflector on the back side of optical element 22' from grating field A1' to grating field A3', from grating field A2' to grating field A4', from grating field B1' to grating field B3', and from grating field B2' to grating field B4', subsequently collide again at measuring standard 10' and interfere with each other according to the first exemplary embodiment and are able to return back to the coupling-out optics.

As illustrated in FIG. 2b, in the present exemplary embodiment, offset distance δx, δy of grating field X1' relative to grating field X2' in terms of the X-direction and Y-direction is in each case identical to the offset distance of grating field X3' relative to grating field X4', identical to the offset distance of grating field A1' relative to grating field A3', identical to the offset distance of grating field A2' relative to grating field A4', identical to the offset distance of grating field B1' relative to grating field B3', and identical to the offset distance of grating field B2' relative to grating field B4'.

On the other hand, in the exemplary embodiment described above with reference to FIGS. 1a to 1c, in terms of all three scanning beam paths, only an offset distance δx of grating fields A1, A2, B1, B2, X1, X3 along the X-direction relative to grating fields A3, A4, B3, B4, X2, X4 exists, while the offset distance δy=0 is selected. In the present exemplary embodiment, as illustrated in FIG. 2b, with regard to all three scanning beam paths, an offset distance δy≠0 of grating fields A1', A2', B1', B2', X1', X3' relative to grating fields A3', A4', B3', B4', X2', X4' along the Y-direction is additionally provided.

Figure 3:
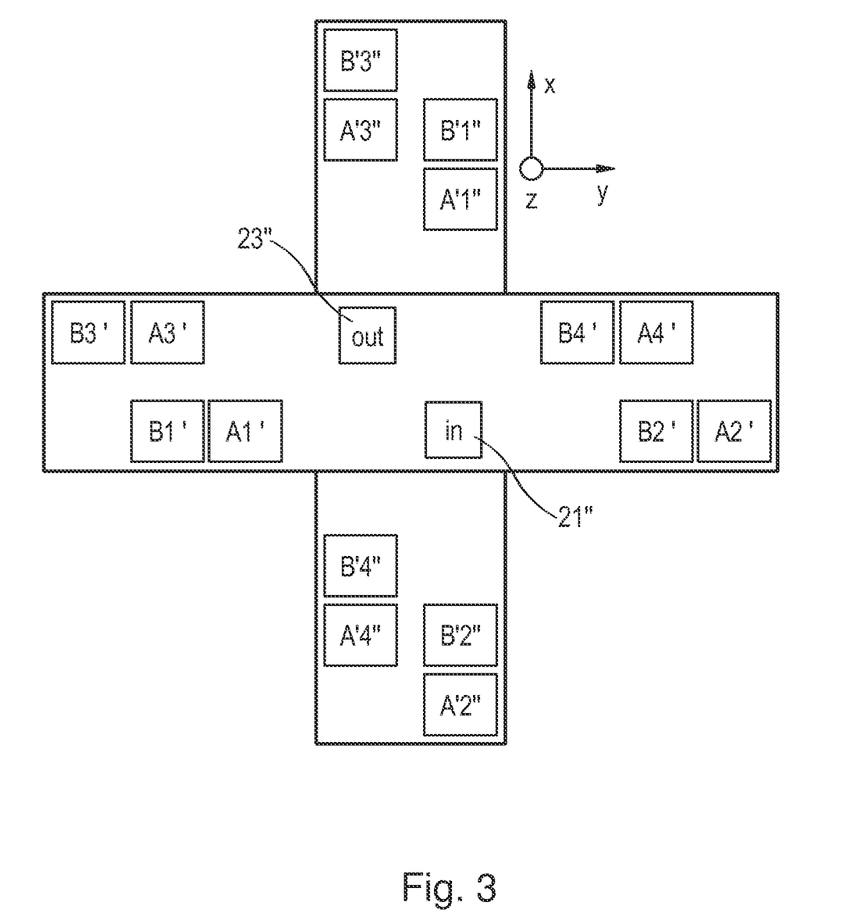
FIG. 3 is a plan view of a scanning plate of a scanning system of an optical position-measuring device according to an example embodiment of the present invention.

A plan view of the top side of the optical element of an optical position-measuring device according to an example embodiment of the present invention is schematically illustrated in FIG. 3 in a representation analogous to FIG. 1c and FIG. 2b. The beam path of the partial beams of rays in the scanning beam paths of the A-axis and B-axis through grating fields A1' to A4' and B1' to B4' is identical to the previous exemplary embodiment illustrated in FIG. 2b. The position measuring along the third shift direction is expanded and carried out analogously to the position measuring of the first two shift directions (A'-axis and B'-axis). Their scanning beam paths and the formation of grating fields A'1" to A'4" and B'1" to B'4" correspond to the scanning beam paths of the A-axis and B-axis as well as grating fields A1' to A4', B1' to B4'. However, the placement of grating fields A'1" to A'4" and B'1" to B'4" is rotated by 90° relative to the Z-direction compared to grating fields A1' to A4' and B1' to B4'. In this manner, in addition to the measurement of lateral shift direction X, it is additionally possible to perform a redundant measurement of vertical shift direction Z. Due to the redundant measuring of vertical shift direction Z, error influences are able to be reduced by averaging, and therefore the accuracy of the position-measuring device may be improved.

In the position-measuring device described in European Published Patent Application No. 1 762 828, the partial beams of rays of the two scanning beam paths provided impinge in each case on the measuring standard again with an offset in the X-direction, e.g., perpendicular to the only lateral measuring direction. In contrast to that, in the position-measuring device hereof, although the two partial beams of rays of the third scanning beam path provided are likewise offset in the X-direction, this corresponds to an offset along the lateral measuring direction.

Because of the additional third scanning beam path provided for determining position along second lateral shift direction X, the scanning distance between the measuring standard and scanning system is established when the grating constant of the measuring standard and offset distances δx and δy, respectively, between adjacent grating fields are established.

Furthermore, it may be provided to select offset distances δx, δy, for example, in the example embodiment illustrated in FIG. 2a between grating fields A1' to A4', B1' to B4', which in each case are traversed by the same partial beam of rays, A1' to A3', A2' to A4', B1' to B3', B2' to B4' and the fields having outcoupling gratings 21', 23' on one hand or between grating fields X1', X2' and grating fields X3', X4' to be identical.

If one assumes that offset distance 6x between grating fields A1' to A4' and B1' to B4' was in each case selected to be minimal, then grating fields X1' to X4' of the third scanning beam path may not be packed closer together. The selection of an identical offset distance δ between the various fields in the optical element of the scanning system thus leads to a minimal unit volume of the position-measuring device.

If one further designates the scanning distance between the top side of the optical element and the measuring standard as Δ, the grating constant of the measuring standard as d, the wavelength of the light used as λ and the spacing of adjacent fields on the optical element as δ, then scanning distance Δ may be obtained according to the following equation 2:

$$\Delta = \frac{2\delta}{\tan(\arcsin(\frac{\lambda}{d}))} \quad \text{(equation 2)}$$

Offset distance δ between the fields is yielded from the rotation tolerances of the scanning system called for in the practical application.

Given an offset distance δ=6 mm, a wavelength λ=976 nm, and a grating constant d=2.048 μm of the measuring standard, a scanning distance Δ=22.137 mm therefore results between the grating side of the optical element and the measuring standard. This represents an enlarged scanning distance compared to the position-measuring device described in European Published Patent Application No. 1 762 828 having only the two scanning beam paths. A scanning distance in air increased in this manner leads to increased sensitivity of the position-measuring device with respect to air turbulences or variations in the refractive index. However, these influences may be compensated for in the position-measuring device in several manners.

Figure 4:
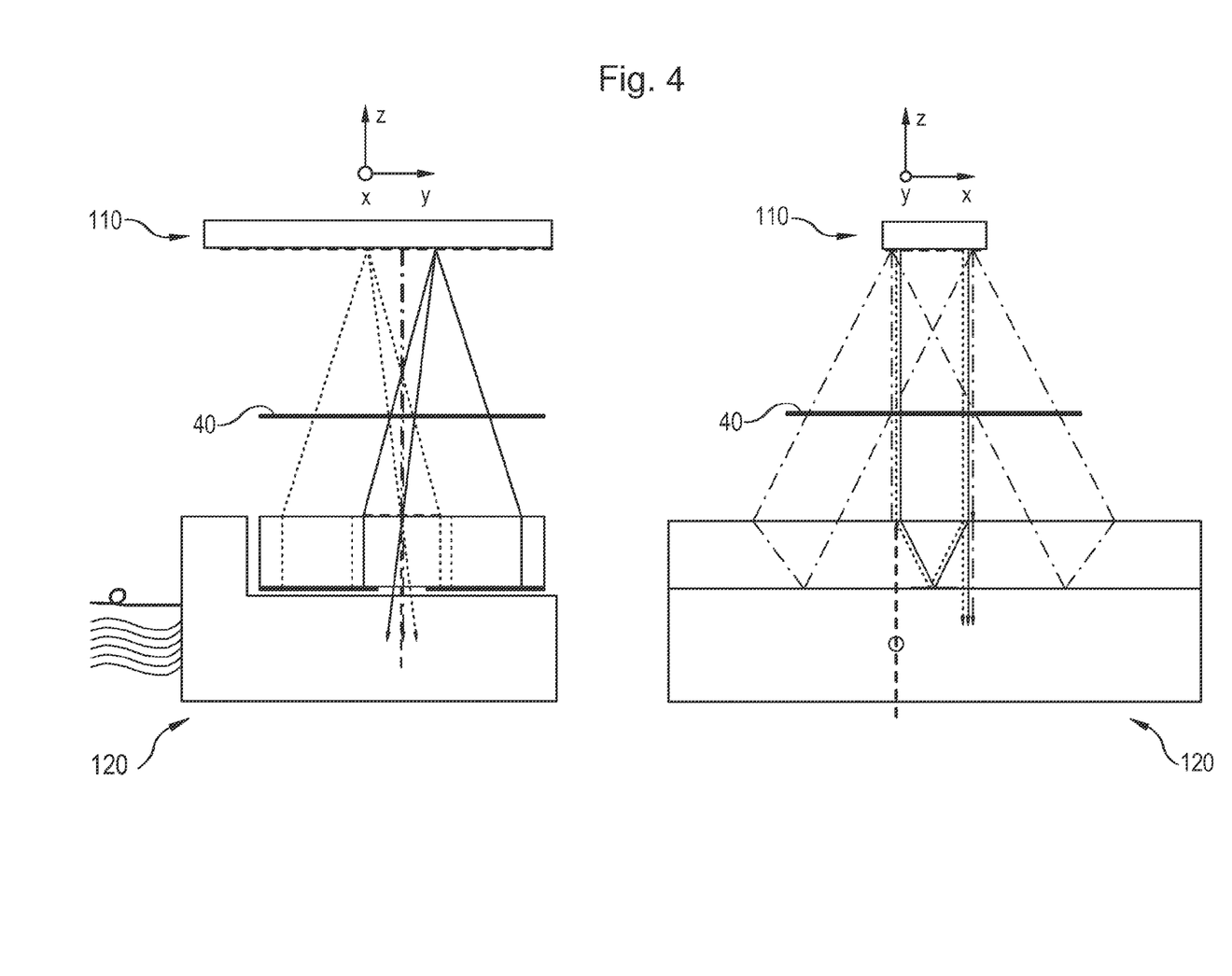
FIG. 4 schematically illustrates scanning beam paths in an optical position-measuring device according to an example embodiment of the present invention.

For example, it is possible to shield the complete scanning beam paths from the ambient air by placing a glass cover 40 over the complete scanning beam paths. A corresponding variation of the optical position-measuring device is illustrated in two cross-sectional views in FIG. 4, analogous to the views illustrated in FIGS. 1a and 1b. With the exception of glass cover 40, this variant corresponds to the first exemplary embodiment explained in more detail above. The position of glass cover 40 should lie as close as possible to measuring standard 110, in order to minimize the free length of path in the three scanning beam paths in air between measuring standard 110 and scanning system 120.

Figure 5:
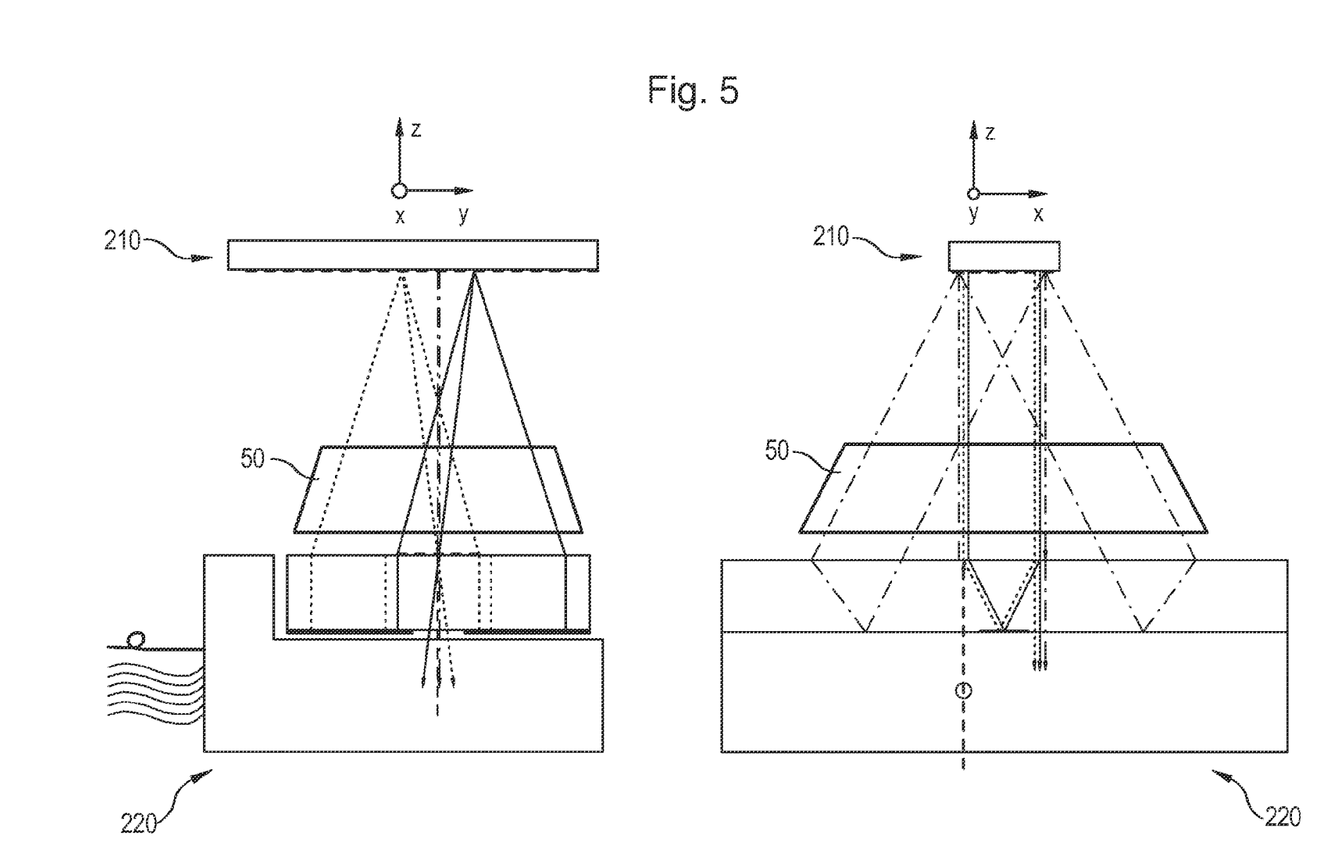
FIG. 5 schematically illustrates scanning beam paths in an optical position-measuring device according to an example embodiment of the present invention.

A second compensation variant is illustrated in FIG. 5. The free air volume between scanning system 220 and measuring standard 210 is filled as completely as possible with a glass body 50 which is thermally compensated. This means that the linear extension of glass body 50 compensates for the change in refractive index. Thus, no changes of refractive index in the air due to changes of pressure, temperature, or moisture are able to influence the determination of position. Likewise, rapid air exchanges are not possible. Thermally compensated glass body 50 is relevant primarily for the scanning beam paths of the A-axis and the B-axis, since here, the paths of the partial beams of rays in glass based on the different angles, and therefore the lengths of travel of the partial beams of rays in glass are different for the various orders of diffraction. A non-compensated glass body leads to a change of the determined position with the temperature. On the other hand, the X-axis is symmetrical. Glass body 50 does not absolutely have to be thermally compensated, so long as it is possible to ensure that there is no temperature gradient between the glasses in the two orders of diffraction.

Figure 6:
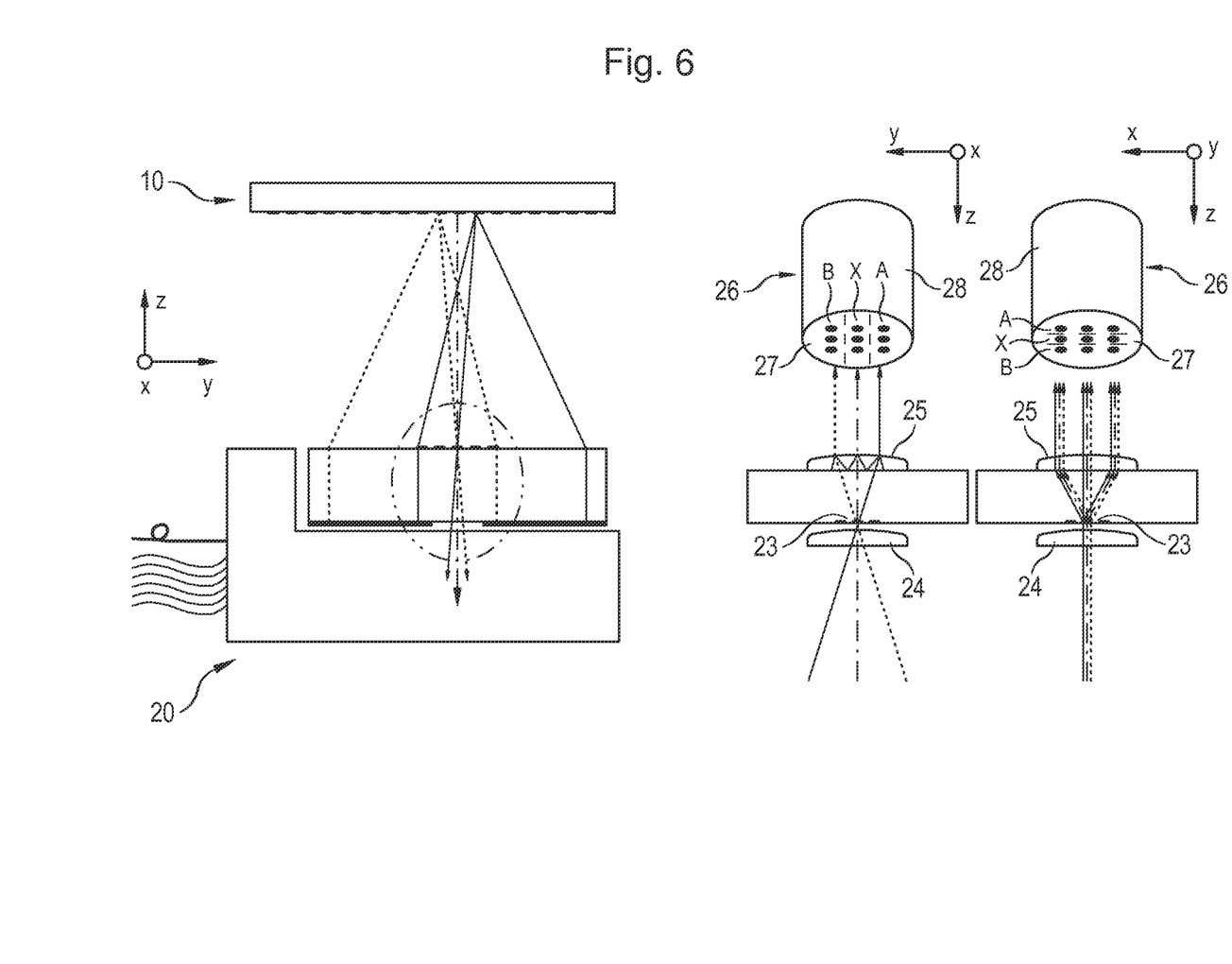
FIG. 6 schematically illustrates scanning beam paths and coupling-out optics of an optical position-measuring device according to an example embodiment of the present invention.

With reference to FIG. 6, in the following, the usage of one common coupling-out optics by all three scanning beam paths provided at the output end in the position-measuring device, via which the interfering partial beams of rays produced in the three scanning beam paths are coupled into a second light guide which then supplies these beams of rays to a downstream detector system, is explained.

Additionally, it should be pointed out again at this point that at the input end, the beam from a light source is supplied via a first light guide and coupling-in optics in common for all three scanning beam paths, to the scanning system.

In the left part of FIG. 6, in analogous manner as FIG. 1b, the three scanning beam paths provided in the first exemplary embodiment are illustrated schematically. In the right side FIG. 6, the splitting of the interfering partial beams of rays of the three scanning beam paths as well as their outcoupling into the second light guide are illustrated schematically in various cross-sectional views. In addition to the three scanning beam paths, a focusing lens 24, a field lens 25, splitting grating 23 on the coupling-out side as well as second light guide 26 having a total of 9 multimode optical fibers 27 are illustrated. The coupling-out optics, which are used by all three scanning beam paths, include focusing lens 24, splitting grating 23 on the coupling-out side, and field lens 25.

Figure 7:
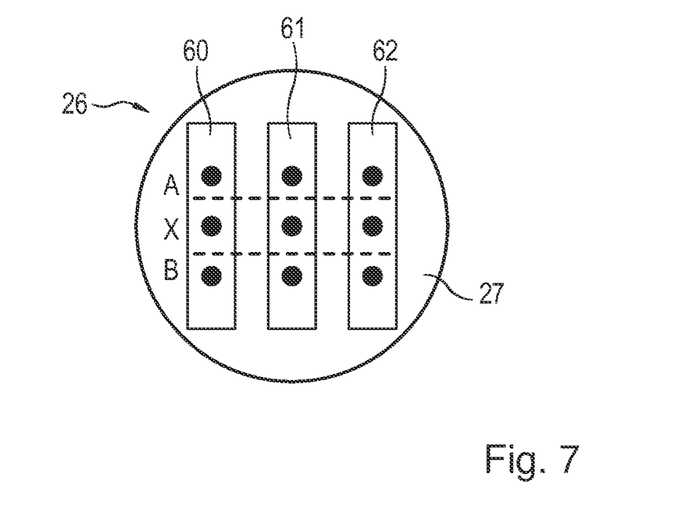
FIG. 7 is a plan view of the ferrule of the coupling-out optics of the optical position-measuring device illustrated in FIG. 6.

As illustrated, the superposed beams of rays of the three scanning beam paths impinge in the YZ-plane on splitting grating 23 and the two lenses 24, 25 from different directions. As a consequence, after passing through lenses 24, 25 in the focal plane, they are spatially separate and may thus be coupled together into multimode optical fibers 27 of second light guide 26, the optical fibers all being held in defined arrangement in a ferrule 28. In this context, field lens 25 is used to collimate the split beams, so that multimode optical fibers 27 do not have to be inserted at an angle into ferrule 28. A plan view of ferrule 28 having the three multimode optical fibers 27 per scanning beam path is illustrated in FIG. 7. As illustrated, the three superposed beams of rays of axes A, B, and X are split in the X-direction into, in each case, three superposed partial beams of rays and coupled separately into corresponding multimode optical fibers 27. On the part of ferrule 28 polarizers—shown only FIG. 7—are applied to each of multimode optical fibers 27, which in each case are oriented such that position-dependent signals, phase shifted by 120°, are obtained in the form of an intensity modulation. Instead of individual polarizers, diffractive polarizers may also be used on a common glass substrate, in which the polarization axes are determined by the orientation of gratings.

According to FIG. 7, the three respective multimode optical fibers 27 for the signals of the A-axis and B-axis are provided in the top and bottom rows, whereas the three multimode optical fibers 27 belonging to the third scanning beam path are placed centrally.

Figure 8:
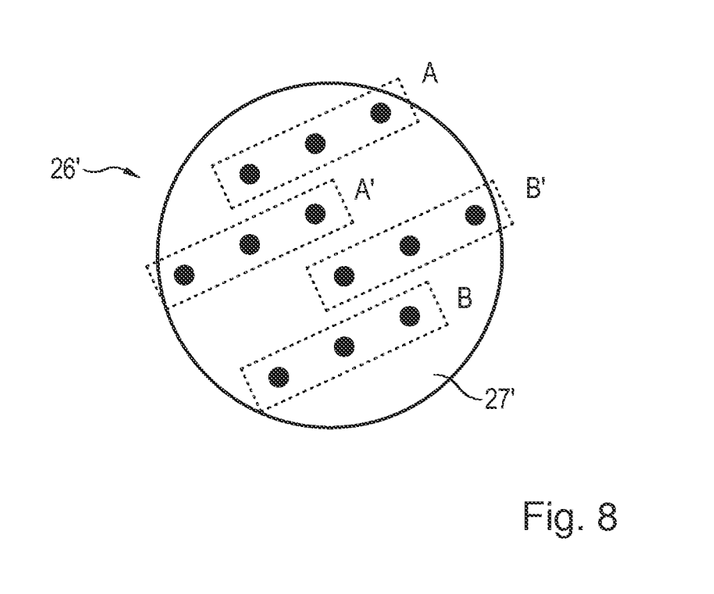
FIG. 8 is a plan view of the ferrule of an optical position-measuring device according to an example embodiment of the present invention.

Based on the same principle, the beams of rays in the exemplary embodiment of the position-measuring device illustrated FIG. 3 are in each case split by the coupling-out optics into three partial beams of rays. In this case, however, a total of four beams of rays from the four scanning beam paths provided there are split into three partial beams of rays each, namely, those of the A-axis and B-axis, as well as those of the A'-axis and B'-axis. By placing the splitting grating at 22.5° relative to the Y-axis, it is possible, with a ferrule configuration illustrated in FIG. 8, to conduct the partial beams of rays into a total of 12 multimode optical fibers 27'. The signals belonging together and phase-shifted by 120° of each axis A, B, A', B' are illustrated in FIG. 8 by the respective rectangles. Not shown in FIG. 8 are the polarizers, which here as well, may either be applied individually or, provided diffractively, may be applied on a common glass substrate.

What is claimed is:

1. An optical position-measuring device for detecting a position of two objects movable relative to one another, comprising:

a measuring standard connected to one of the two objects;
a scanning system adapted to scan the measuring standard, the scanning system being connected to the other one of the two objects, the scanning system adapted to permit simultaneous determination of position along a first lateral shift direction of the objects, along a second lateral shift direction of the objects that is perpendicular to the first lateral shift direction, and along a vertical shift direction of the objects, the scanning system adapted to form first and second scanning beam paths to generate a group of phase-shifted signals at an output end from interfering partial beams of rays, the scanning system adapted to form a third scanning beam path to determine position along the second lateral shift direction;
a light source adapted to supply a beam to the scanning system via a first light guide and coupling-in optics that are common to all three scanning beam paths; and
coupling-out optics that are common to all three scanning beam paths and that are adapted to couple the interfering partial beams of rays produced in the three scanning beam paths into a second light guide to supply the interfering partial beams of rays to a detector system;
wherein the measuring standard includes a cross grating.

2. The optical position-measuring device according to claim 1, wherein the scanning system includes, at an input end, a splitting grating adapted to split the beam of rays incoming from the coupling-in optics into three scanning beam paths, +/−1$^{st}$ orders of diffraction of the splitting grating being assigned to the first and second scanning beam paths, and a zeroth order of diffraction being assigned to the third scanning beam path.

3. The optical position-measuring device according to claim 1, wherein in the third scanning beam path, a partial beam of rays propagates in a direction of the measuring standard, is split into two further partial beams of rays, which are reflected back in a direction of the scanning system, where in each case the further partial beams of rays undergo a retroreflection and, offset along the second lateral shift direction, propagate again in the direction of the measuring standard, where further partial beams of rays come interferingly to superposition and propagate back in the direction of the scanning system, where a plurality of phase-shifted signals with regard to a relative movement along the second lateral shift direction are detectable.

4. The optical position-measuring device according to claim 3, wherein the scanning system includes an optical element, on whose side facing the measuring standard are disposed a plurality of grating fields assigned in defined manner to the scanning beam paths and having transmission gratings as well as a splitting grating on a coupling-in side and a splitting grating on a coupling-out side, and to reflect the partial beams of rays back, the optical element includes diffractive components adapted to perform several optical functions.

5. The optical position-measuring device according to claim 1, wherein the scanning system includes an optical element, on whose side facing the measuring standard are disposed a plurality of grating fields assigned in defined manner to the scanning beam paths and having transmission gratings as well as a splitting grating on a coupling-in side and a splitting grating on a coupling-out side.

6. The optical position-measuring device according to claim 5, wherein offset distances between the grating fields and the outcoupling gratings along the second lateral shift direction are identical.

7. The optical position-measuring device according to claim 5, wherein located between the optical element and the measuring standard is a glass cover which extends over all scanning beam paths.

8. The optical position-measuring device according to claim 5, wherein a thermally compensated glass body is arranged between the optical element and the measuring standard, so that temperature changes do not alter optical path lengths of the partial beams of rays traversing in the glass.

9. The optical position-measuring device according to claim 1, wherein the second light guide includes three multimode fibers per scanning beam path, the multimode fibers being located in a common ferrule at an end on the coupling-in side.

10. The optical position-measuring device according to claim 1, wherein the scanning beam paths of all three shift directions have a common scanning center.

11. The optical position-measuring device according to claim 1, wherein between the first and second impingement on the measuring standard, at least one partial beam of rays in the scanning beam paths undergoes an offset along the respective shift direction.

12. An optical position-measuring device for detecting a position of two objects movable relative to one another, comprising:
a measuring standard connected to one of the two objects;
a scanning system adapted to scan the measuring standard, the scanning system being connected to the other one of the two objects, the scanning system adapted to permit simultaneous determination of position along a first lateral shift direction and along a vertical shift direction of the objects, the scanning system adapted to form first and second scanning beam paths to generate a group of phase-shifted signals at an output end from interfering partial beams of rays, the scanning system adapted to form a third scanning beam path to determine position along a second lateral shift direction;
a light source adapted to supply a beam to the scanning system via a first light guide and common coupling-in optics for all three scanning beam paths; and
common coupling-out optics adapted to couple the interfering partial beams of rays produced in the three scanning beam paths into a second light guide to supply the interfering partial beams of rays to a detector system;
wherein in the third scanning beam path, a partial beam of rays propagates in a direction of the measuring standard, is split into two further partial beams of rays, which are reflected back in a direction of the scanning system, where in each case the further partial beams of rays undergo a retroreflection and, offset along the second lateral shift direction, propagate again in the direction of the measuring standard, where further partial beams of rays come interferingly to superposition and propagate back in the direction of the scanning system, where a plurality of phase-shifted signals with regard to a relative movement along the second lateral shift direction are detectable.

13. The optical position-measuring device according to claim 12, wherein the scanning system includes, at an input end, a splitting grating adapted to split the beam of rays incoming from the coupling-in optics into three scanning beam paths, +/−1$^{st}$ orders of diffraction of the splitting grating being assigned to the first and second scanning beam paths, and a zeroth order of diffraction being assigned to the third scanning beam path.

14. The optical position-measuring device according to claim 12, wherein the first and second lateral shift directions are oriented perpendicularly relative to each other, and the measuring standard includes a cross grating.

15. The optical position-measuring device according to claim 12, wherein the scanning system includes an optical element, on whose side facing the measuring standard are disposed a plurality of grating fields assigned in defined manner to the scanning beam paths and having transmission gratings as well as a splitting grating on a coupling-in side and a splitting grating on a coupling-out side, and to reflect the partial beams of rays back, the optical element includes diffractive components adapted to perform several optical functions.

16. An optical position-measuring device for detecting a position of two objects movable relative to one another, comprising:
- a measuring standard connected to one of the two objects;
- a scanning system adapted to scan the measuring standard, the scanning system being connected to the other one of the two objects, the scanning system adapted to permit simultaneous determination of position along a first lateral shift direction and along a vertical shift direction of the objects, the scanning system adapted to form first and second scanning beam paths to generate a group of phase-shifted signals at an output end from interfering partial beams of rays, the scanning system adapted to form a third scanning beam path to determine position along a second lateral shift direction;
- a light source adapted to supply a beam to the scanning system via a first light guide and common coupling-in optics for all three scanning beam paths; and
- common coupling-out optics adapted to couple the interfering partial beams of rays produced in the three scanning beam paths into a second light guide to supply the interfering partial beams of rays to a detector system;
- wherein between the first and second impingement on the measuring standard, at least one partial beam of rays in the scanning beam paths undergoes an offset along the respective shift direction; and
- wherein the scanning system includes, at an input end, a splitting grating adapted to split the beam of rays incoming from the coupling-in optics into three scanning beam paths, +/−$1^{st}$ orders of diffraction of the splitting grating being assigned to the first and second scanning beam paths, and a zeroth order of diffraction being assigned to the third scanning beam path.

17. The optical position-measuring device according to claim 16, wherein in the third scanning beam path, a partial beam of rays propagates in a direction of the measuring standard, is split into two further partial beams of rays, which are reflected back in a direction of the scanning system, where in each case the further partial beams of rays undergo a retroreflection and, offset along the second lateral shift direction, propagate again in the direction of the measuring standard, where further partial beams of rays come interferingly to superposition and propagate back in the direction of the scanning system, where a plurality of phase-shifted signals with regard to a relative movement along the second lateral shift direction are detectable.

18. The optical position-measuring device according to claim 16, wherein the scanning system includes an optical element, on whose side facing the measuring standard are disposed a plurality of grating fields assigned in defined manner to the scanning beam paths and having transmission gratings as well as a splitting grating on a coupling-in side and a splitting grating on a coupling-out side.

19. The optical position-measuring device according to claim 16, wherein the second light guide includes three multimode fibers per scanning beam path, the multimode fibers being located in a common ferrule at an end on the coupling-in side.

20. The optical position-measuring device according to claim 16, wherein the first and second lateral shift directions are oriented perpendicularly relative to each other, and the measuring standard includes a cross grating.

21. The optical position-measuring device according to claim 16, wherein the scanning beam paths of all three shift directions have a common scanning center.

22. The optical position-measuring device according to claim 17, wherein the scanning system includes an optical element, on whose side facing the measuring standard are disposed a plurality of grating fields assigned in defined manner to the scanning beam paths and having transmission gratings as well as a splitting grating on a coupling-in side and a splitting grating on a coupling-out side, and to reflect the partial beams of rays back, the optical element includes diffractive components adapted to perform several optical functions.

* * * * *